(12) United States Patent
Kroeger et al.

(10) Patent No.: US 6,901,242 B2
(45) Date of Patent: May 31, 2005

(54) SYSTEM AND METHOD FOR MITIGATING INTERMITTENT INTERRUPTIONS IN AN AUDIO RADIO BROADCAST SYSTEM

(75) Inventors: Brian W. Kroeger, Sykesville, MD (US); Roy R. Stehlik, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 765 days.

(21) Appl. No.: 09/747,143

(22) Filed: Dec. 22, 2000

(65) Prior Publication Data

US 2001/0003089 A1 Jun. 7, 2001

Related U.S. Application Data

(62) Division of application No. 08/947,902, filed on Oct. 9, 1997, now Pat. No. 6,178,317.

(51) Int. Cl.[7] .................. H04B 1/00; H04B 15/00; H04B 17/00; H04B 7/00; H04B 1/10
(52) U.S. Cl. .................. 455/45; 455/60; 455/63.1; 455/67.13; 455/70; 455/296; 455/550.1
(58) Field of Search ................. 455/42, 43, 44, 455/45, 500–506, 8, 10, 11.1, 17, 230–231, 295–296, 313, 334, 3.06, 63.1, 67.13, 67.16, 70, 550.1, 553.1, 242.1, 242.2, 243.1, 268; 370/277, 278, 281, 282, 319, 333; 725/114, 116, 126, 144, 146, 725

(56) References Cited

U.S. PATENT DOCUMENTS 3,665,395 A * 5/1972 Bochmann ............. 340/146.1
3,781,795 A * 12/1973 Zegers ............. 340/146.1 BE
4,291,405 A * 9/1981 Jayant et al. ............. 371/31
5,278,826 A * 1/1994 Murphy et al. ............. 370/76
6,602,835 B2 * 2/1997 Seki et al. ............. 370/206
5,673,292 A * 9/1997 Carlin ............. 375/269
5,764,706 A * 6/1998 Carlin et al. ............. 375/326
5,949,796 A * 9/1999 Kumar ............. 370/529
6,005,894 A * 12/1999 Kumar ............. 375/270
6,246,698 B1 * 6/2001 Kumar ............. 375/487

FOREIGN PATENT DOCUMENTS

WO    WO 97/08866    * 3/1997    ............. H04L/7/00

* cited by examiner

*Primary Examiner*—William Trost
*Assistant Examiner*—Memess Zewdu
(74) *Attorney, Agent, or Firm*—Robert P. Lenart, Esq.; Pietragalio, Bosick & Gordon

(57) ABSTRACT

A system is provided wherein a primary radio signal and a redundant radio signal are transmitted from a transmitter subsystem and received by a receiver subsystem. The output of an audio source is coupled to a modulator for modulating a radio frequency signal for coupling to a transmit antenna. A second output of audio source is coupled to a delay circuit, for adding a predetermined time delay thereto. The delayed audio source signal is coupled to a modulator for modulating a second radio frequency signal that is also coupled to the transmit antenna. The receiver subsystem receives both the primary radio signal and the delayed redundant radio signal and couples each to a respective demodulator. At least one demodulator includes a circuit for determining the degradation in the primary radio signal and provides a quality measurement output signal to a blend control circuit.

13 Claims, 7 Drawing Sheets

SYSTEM AND METHOD FOR MITIGATING INTERMITTENT INTERRUPTIONS IN AN AUDIO RADIO BROADCAST SYSTEM

CROSS REFERENCE TO RELATED APPLICATION

This application is a divisional application of U.S. patent application Ser. No. 08/947,902, filed Oct. 9, 1997, now U.S. Pat. No. 6,178,317.

BACKGROUND OF THE INVENTION

1. Field of the Invention

This invention directs itself to a system and method of mitigating the effects of signal fades, temporary blockages or severe channel impairments in an audio broadcasting system. More particularly, the system and method employs the transmission of a primary broadcast signal along with a redundant signal, the redundant signal being delayed by a predetermined amount of time, on the order of several seconds, with respect to the primary broadcast signal. A corresponding delay is incorporated in the receiver for delaying the received primary broadcast signal. Still further, this invention is directed to the concept of detecting degradation in the primary broadcast channel that represents a fade or blockage in the RF signal, before such is perceived by the listener. In response to such detection, the delayed redundant signal is temporarily substituted for the corrupted primary audio signal, acting as a "gap filler" when the primary signal is corrupted or unavailable. More in particular, this invention directs itself to use of a blend function for smoothly transitioning from the primary audio signal to the delayed redundant signal.

2. Prior Art

In fixed receiver installations, such as home receivers, the fading statistics are generally stationary, except for occasional temporary fades caused by passing vehicles or aircraft, and so effective mitigation of fades and blockages for these applications can be as simple as installing a better antenna or repositioning the existing antenna. In automotive applications, however, fading and blockage statistics are not stationary, being dependent on the vehicle location and velocity, and effective mitigation requires more sophisticated methods.

Digital Audio Broadcasting (DAB) techniques are being proposed to improve the quality of broadcasting over conventional AM and FM analog signals. In-Band-On-Channel (IBOC) DAB is a digital broadcasting scheme, likely to be adopted in the United States, in which analog AM or FM signals are simulcast along with the DAB signal The digital audio signal is generally compressed such that a minimum data rate is required to convey the audio information with sufficiently high fidelity. Terrestrial DAB systems generally have the characteristic that fades and blockages have a more deleterious effect on received audio than they do on analog modulated systems, such as commercial AM or FM broadcasts because these DAB systems do not degrade gracefully. This effect is exacerbated for in-band on-channel (IBOC) systems which are constrained to have orders of magnitude lower transmit power than the analog broadcast signals whose frequency band they share. IBOC DAB systems transmit both the analog and DAB signal simultaneously within the required spectral mask of the analog signal alone. Therefore, the IBOC DAB concept allows a station to offer digital audio while retaining its analog listeners, but the digital broadcast will not gain acceptance unless the audio loss due to temporary fades and blockages is mitigated.

SUMMARY OF THE INVENTION

A system for mitigating intermittent interruptions in an audio radio broadcast system is provided. The system includes a source of an audio signal-and a transmitter subsystem having a first input coupled to the audio source for modulating at least one first carrier signal with the audio signal to broadcast a primary radio signal. The system also includes a first delay circuit having an input coupled to the audio source for adding a first predetermined time delay to the audio signal to form a delayed redundant audio signal at an output thereof, the output being coupled to a second input of the transmitter subsystem for modulating at least one second carrier signal with the delayed redundant audio signal to broadcast a delayed redundant radio signal simultaneously with the primary radio signal. The system further includes a receiver subsystem for receiving the primary radio signal and the delayed redundant radio signal, the receiver subsystem demodulating the primary radio signal to provide the audio signal to a first output thereof and demodulating the delayed redundant radio signal to provide the delayed redundant audio signal to a second output thereof. The receiver subsystem includes a circuit for detecting degradation of the received primary radio signal, the circuit for degradation detection providing a quality measurement signal to a third output of the receiver subsystem. The system includes a second delay circuit having an input coupled to the first output of the receiver subsystem for adding a second predetermined time delay to the audio signal to form a delayed primary audio signal at an output thereof, the second predetermined time delay being substantially equal to the first predetermined time delay. Still further, the system includes a blending circuit having a first input coupled to an output of the second delay circuit and second and third inputs respectively coupled to the second and third outputs of the receiver subsystem for combining a first weighting factor with the delayed primary audio signal and a second weighting factor with the delayed redundant audio signal and combining the weighted delayed primary audio signal with the weighted delayed redundant audio signal to form a composite audio signal. The first weighting factor is smoothly transitioned between a first value and a second value responsive to the quality measurement signal being less than a predetermined threshold value. The second weighting factor is smoothly transitioned between the second value and the first value responsive to the quality measurement signal being less than the predetermined threshold value. Additionally, the system includes an audio output circuit coupled to the blending circuit for converting the composite audio signal to an aural signal.

From another perspective, a method of mitigating intermittent interruptions in an in-band on-channel digital audio broadcast system is provided. Each channel includes at least one carrier signal modulated with an analog audio signal and a plurality of subcarriers modulated with a digital representation of the analog signal, wherein the method comprises the steps of:

(a) adding a predetermined first time delay to the analog audio signal prior to modulation of the at least one carrier signal, the analog audio signal being delayed relative to the digital representation of the analog audio signal;

(b) providing a receiver for receiving both the at least one modulated carrier signal and the plurality of modulated subcarriers to recover the delayed analog audio signal and the digital representation of the analog audio signal;

(c) detecting a predetermined level of degradation in the digital representation of the analog audio signal;

(d) adding a predetermined second time delay to the digital representation of the analog audio signal and converting the delayed digital representation of the analog audio signal to form a primary audio signal; and, (e) substituting the delayed analog audio signal for the primary audio signal when the predetermined level of degradation is detected.

DESCRIPTION OF THE PREFERRED EMBODIMENT

Figure 1:
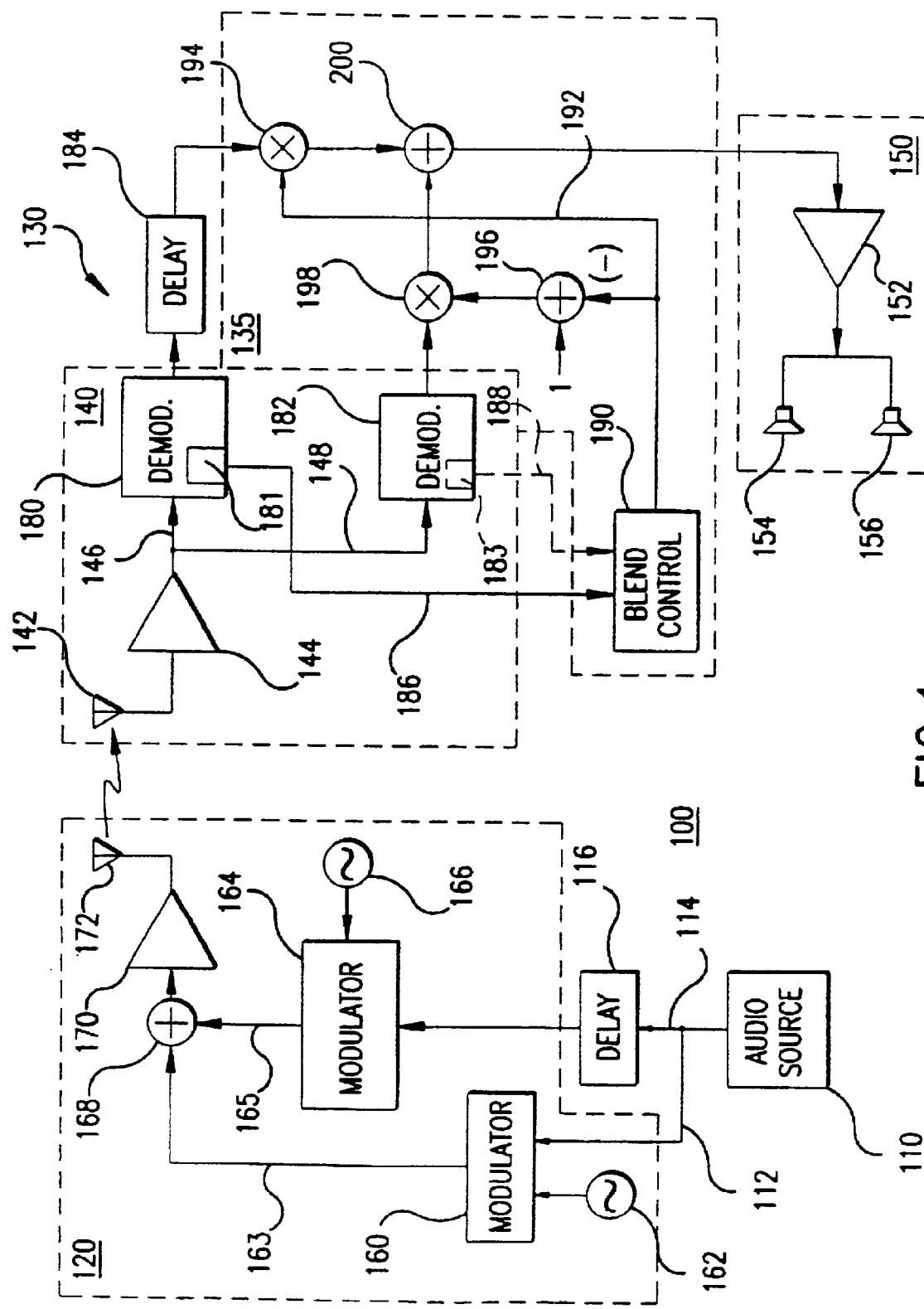
FIG. 1 is a circuit block diagram of the present invention.

Referring to FIGS. 1–9, and particularly to FIG. 1, there is shown system 100 for mitigating intermittent interruptions in an audio radio broadcast system. Conventionally, FM radios mitigate the effects of fades or partial blockages by transitioning from full stereophonic audio to monophonic audio. Some degree of mitigation is achieved because the stereo information which is modulated on a subcarrier, requires a higher signal-to-noise ratio to demodulate to a given quality level than does the monophonic information which is at the base band. However, there are some blockages which sufficiently "take out" the base band and thereby produce a gap in the reception of the audio signal. System 100 is designed to mitigate even those latter type outages in conventional analog broadcast systems and particularly adapted for use in digital audio broadcast (DAB) systems, where such outages are of an intermittent variety and do not last for more than a few seconds. To accomplish that mitigation, a second signal is simulcasted along with the primary radio signal, the second signal having a redundant audio content.

Of particular importance, is the addition of a significant delay in the second signal with respect to the primary broadcast signal. That delay is significantly greater than the processing delays introduced by the digital processing in a DAB system, the delay being greater than 2.0 seconds, and preferably within a 3.0–5.0 second range.

Therefore, in system 100 an audio source 110 provides an output to a transmitter subsystem 120 through coupling line 112. Transmitter subsystem 120 includes a modulator 160 which receives the audio source signal and modulates a carrier signal 162 provided thereto for providing a modulated primary broadcast signal on line 163 for coupling to the output amplifier 170 through an adder 168. Carrier signal 162 may be a radio frequency signal in either the AM or FM frequency band. Audio source 110 also provides an output 114 to a delay circuit 116, delay circuit 116 providing at least a two second delay to the audio signal. The output of delay 116 is coupled to a modulator 164 of the transmitter subsystem 120 for modulating a second carrier signal 166 coupled thereto. The second carrier signal 166 may be a subcarrier within a predetermined broadcast signal spectrum. As the audio signal supplied to modulator 164 is identical to that provided to modulator 160, only delayed with respect to that signal, the modulated output of modulator 164 provides a delayed redundant signal that is coupled to adder 168 by coupling line 165. The combined outputs of modulators 160 and 165 are then coupled to the output amplifier 170 of the transmitter subsystem 120 for coupling to the broadcast antenna 172.

A receiver subsystem 140 includes an antenna 142 for receiving the signal broadcast from the transmitter antenna 172. The signal received by antenna 142 is coupled to the front end amplifier/tuning circuits 144 of the receiver subsystem 140. The modulated primary audio broadcast signal is coupled to the primary demodulator 180 by coupling line 146, whereas the modulated delayed redundant audio broadcast signal is coupled to the second demodulator 182 by the coupling line 148. Primary demodulator 180 recovers the audio source signal, as is conventional, and couples the recovered signal to the delay circuit 184. Delay circuit 184 adds a predetermined delay to the recovered primary audio signal for coupling to the output circuitry 150. The delay introduced by the delay circuit 184 is substantially equal to the delay provided by delay circuit 116. Delay circuit 184 is intended to realign the temporal relationship between the primary audio signal and the redundant audio signal, and therefore may introduce a delay time which is slightly greater or slightly less than that introduced by the delay circuit 116, depending upon what other processing delays may have been introduced into one or the other of the two parallel communication paths.

The delay introduced by delay circuits 116, 184 must be sufficiently long so that outages of the parallel broadcast paths are substantially independent, the probability of an outage after such diversity being the square of the probability of an outage without that diversity. The delay time can be quantified with knowledge of the auto-correlation function of the channel outage due to severe impairment. This autocorrelation function is expressed as:

$$R(\tau)=E\{x(t)\cdot x(t-\tau)\} \quad (1)$$

where: x(t) is defined as the stochastic process of the channel loss probability such that a "1" is assigned when the channel is lost and a "0" is assigned when the channel is clear, and τ is the diversity delay time offset between the two signals. The probability of outage without diversity is expressed as:

$$p=E\{x(t)\} \quad (2)$$

The autocorrelation function represents the probability of channel outage after diversity improvement as a function of time offset. From a practical point, the diversity delay time offset must be also sufficiently large to allow detection of impairment of the primary signal and the transition from the primary signal to the redundant signal. However, the diversity delay time offset cannot be so great as to impair the listener's ability to quickly tune the receiver subsystem to a desired channel.

Under non-interference conditions, the recovered primary audio signal is delayed in delay circuit 184 and then coupled to the audio output circuit 150 through blend circuit subsystem 135. Blend circuit subsystem 135 provides the appropriate weighting for combination with the primary audio signal, and the redundant audio signal. The primary audio signal is coupled from delay circuit 184 to a multiplier 194 for weighting supplied from blend control 190 through the coupling line 192. From multiplier 194, the weighted and delayed primary audio signal is coupled to the adder 200 for combination with the weighted redundant audio signal, which during periods of non-interference has a value equal to 0. From adder 200, the signal is coupled to the output amplifier 152 of the output circuit 150. Output amplifier 152 drives the speakers 154 and 156. As will be described in following paragraphs, the primary audio signal may in fact be a stereo audio signal which is transmitted digitally or by conventional FM multiplex broadcast means. Under such circumstances, both audio channels, left and right, are delayed by circuit 184, weighted by circuit 194, and combined with the appropriately weighted redundant signal in adder 200. From adder 200, the two channels would be amplified and coupled to the appropriate speakers in output circuit 150, as represented by speakers 154 and 156.

The circuitry of demodulator 180 includes circuitry 181 for detecting degradation in the received primary radio signal. In other words, the circuitry of demodulator 180 includes circuits for making a quality measurement of the recovered primary audio signal, which measurement includes the determination of one or more parameters such as the signal-to-noise ratio, signal power level, and for digital signals the bit error rate and results of a cyclic redundancy check. The quality measurement circuitry 181 provides an output signal on line 186 to the blend control circuit block 190, the output being below a predetermined value when a fade or blockage is detected. Optionally, the demodulator circuit 182 may also be provided with degradation detection circuitry 183 for monitoring the quality of the recovered redundant audio signal, providing a quality measurement signal output on line 188 to blend control circuit block 190. Blend control circuit block 190 outputs a weighting factor on line 192 for controlling the substitution of the recovered delayed redundant audio signal for the delayed recovered primary audio signal. The weighting factor output from the blend control circuit block 190 is coupled to a adder 196, wherein the weighting factor is subtracted from unity to provide the proper weighting value to be combined with the recovered delayed redundant audio signal supplied from the demodulator circuitry 182. Thus, when there is no interference detected, the blend control circuit block 190 outputs a weighting factor of unity, which provides a "0" output from adder 196 for combination with the recovered delayed redundant audio signal in the multiplier 198. As the weighting factor is "0", there will be no redundant signal mixed with the primary audio signal in adder 200.

When the quality measurement signal supplied on line 186 indicates detection of sufficient degradation, the quality of the signal being below a predetermined threshold value, blend control circuit block 190 changes the weighting function from a value of "1" to a value of "0", that transition occurring smoothly and over a predetermined time period. That predetermined time period may be within the approximating range of 0.25–1.5 seconds. Thus, during the transition the primary audio signal is faded out and the redundant signal faded in, with the delayed redundant audio signal totally replacing the delayed primary audio signal for the remaining period of the outage, and then, responsive to the quality measurement signal on line 186, blend control circuit block 190 transitions the weighting factor from "0" to "1". The transition from "1" to "0" and "0" to "1" is made smoothly over the same predetermined time period so as to avoid any clicks or other audio artifacts which would be noticeable to the user. A sinusoidal transfer function may be utilized for accomplishing the smooth transition between the maximum and minimum weighting values. As the primary signal is delayed by circuit 184 before coupling to the audio output circuit, the quality measurement circuit 181, in effect, predicts an outage in the primary communications path. Upon detection of such an outage, there are several seconds available in which to blend in the redundant audio signal.

Figure 2A:
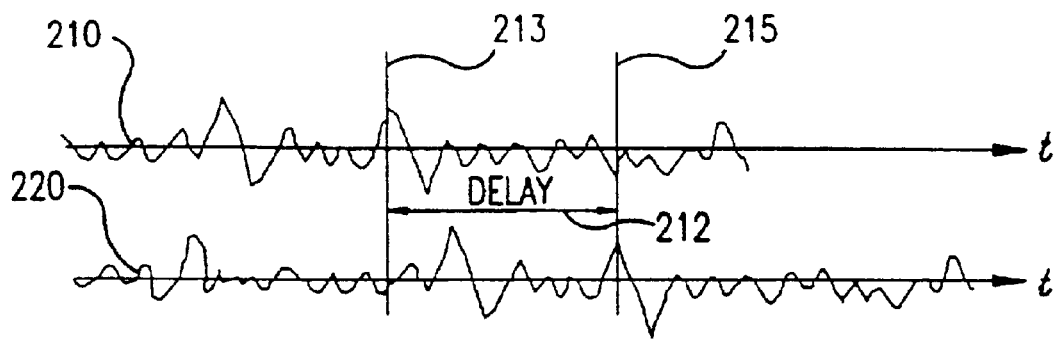
FIGS. 2A–2D are timing diagrams illustrating an aspect of the present invention.

Referring now to FIG. 2A, there is shown a timing diagram representing the transmitted primary and redundant audio signals. The primary audio signal 210 and redundant audio signal 220 are shown with respect to time. The redundant audio signal is identical to the primary audio signal, but delayed, as shown by the vertical reference lines 213 and 215, indicating the time delay period 212. As previously discussed, the time delay period 212 is a time period that is greater than 2.0 seconds.

Figure 2B:
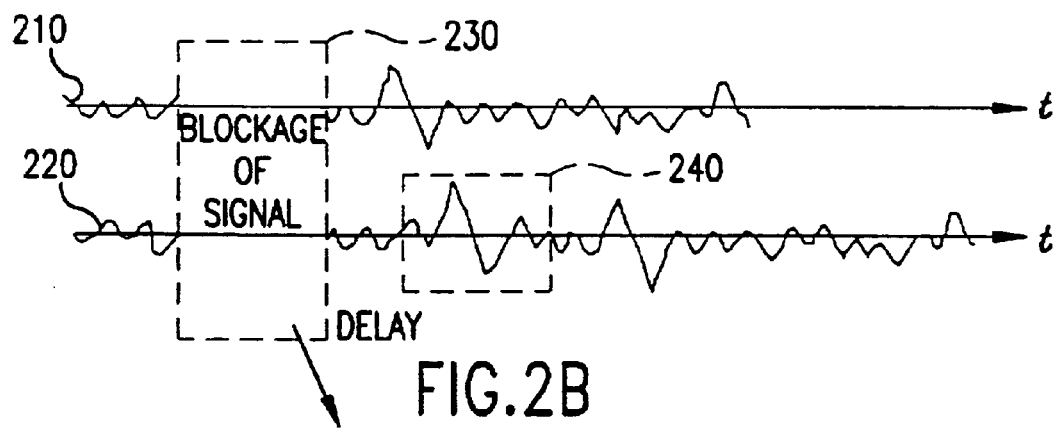
Figure 2C:
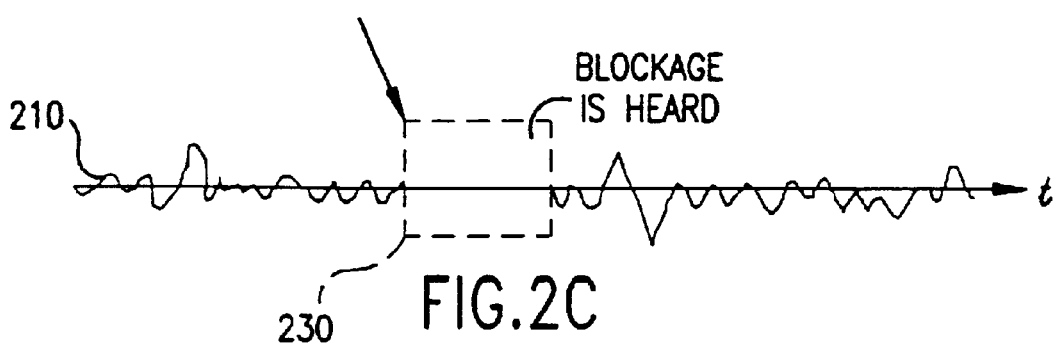
Figure 2D:
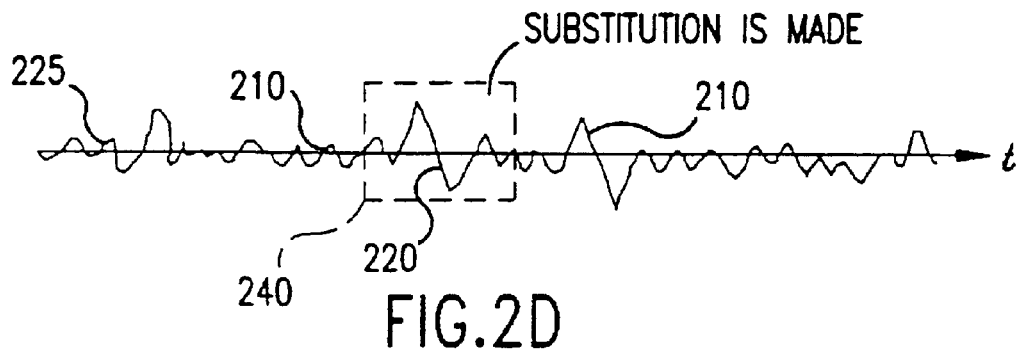

Referring now to FIG. 2B, there is shown the primary audio signal 210 and redundant delayed audio signal 220 wherein a time segment 230 thereof is subject to sufficient interference or fading to be considered a blockage. Due to the time diversity delay of the redundant audio signal 220 with respect to the primary audio signal 210, the portion of the primary signal 210 within the blockage time period 230 corresponds to the audio segment 240 of the redundant audio signal 220. When the primary audio signal 210 is processed, as shown in FIG. 2C, the blocked signal time segment 230 would be heard by the user subsequent to the time delay established by the delay circuit 184, as previously discussed. However, as the blending circuit 135 responds to the detection of the blockage, the time segment 240 of the redundant audio signal 220 is blended in with the primary audio signal to provide a composite audio signal 225, wherein the audio signal is formed by the primary audio signal 210, except during the time segment 240, wherein the redundant audio signal 220 is substituted therefor.

Figure 3:
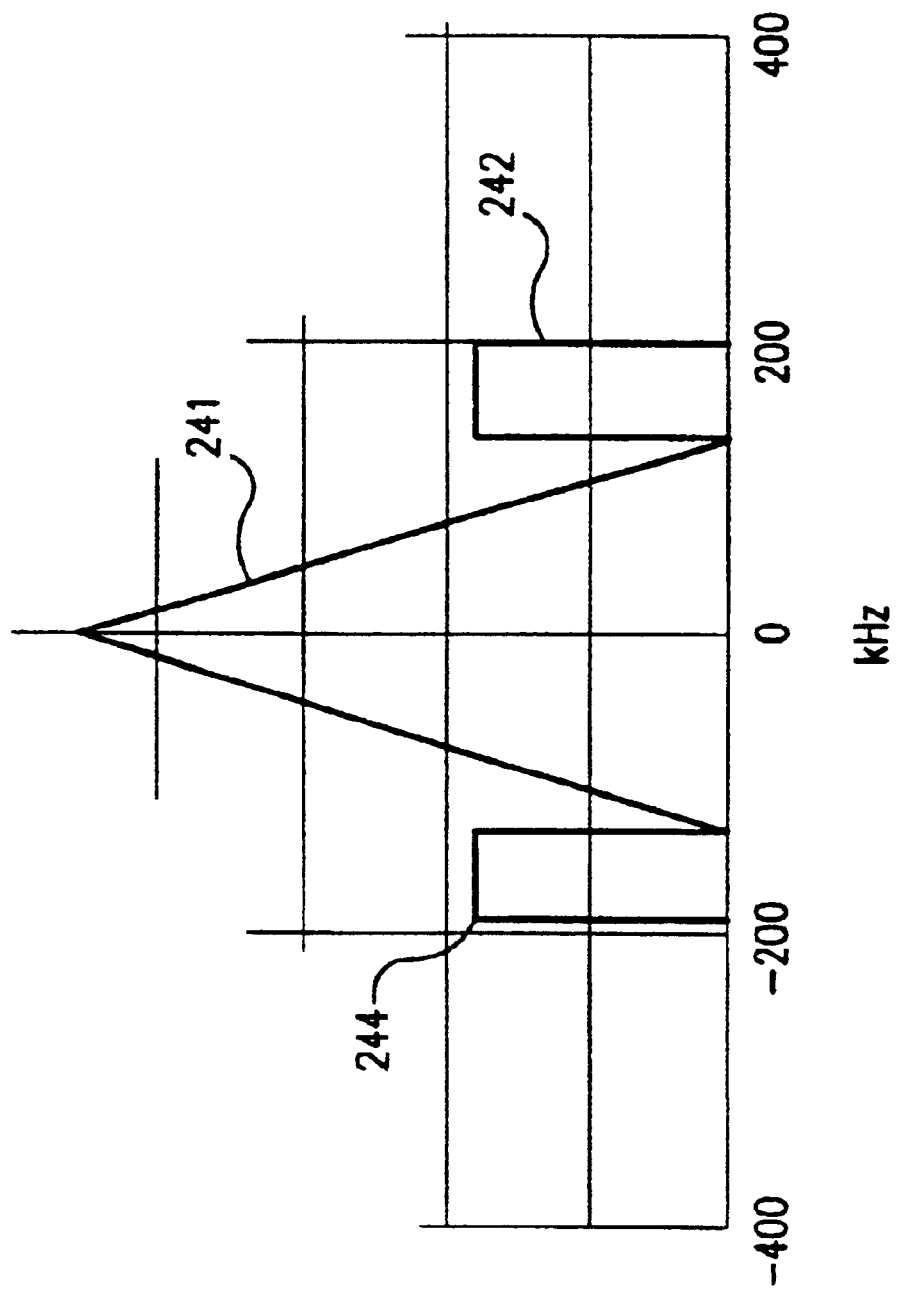
FIG. 3 is a diagram illustrating the spectrum for an in-band on-channel digital audio broadcast system.
Figure 6:
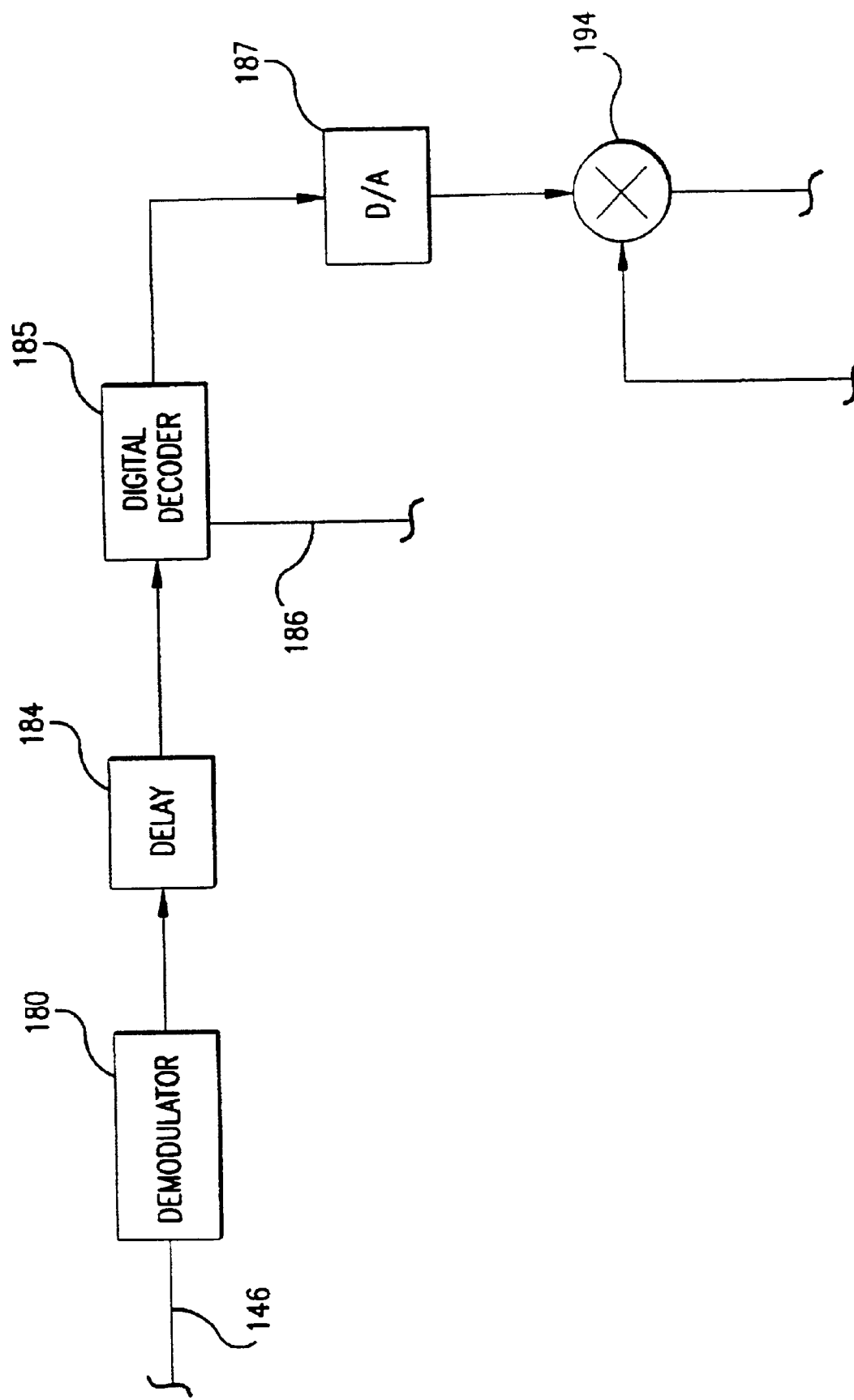
FIG. 6 is a circuit block diagram of a portion of the receiver subsystem for a digital application of the present invention.

One application for system 100 is in IBOC DAB, wherein the in-band digital audio broadcast is modulated on 95 orthogonal frequency division multiplex subcarriers located on each side of the FM modulated carrier, as shown in FIG. 3. FIG. 3 represents the power spectral densities of the FM modulated broadcast signal 241 and the IBOC DAB signals 242 and 244. The 95 subcarriers of the digital audio broadcast operate the spectrum from 130 kHz–199 kHz away from the FM center frequency, in both the upper and lower side bands. For digital audio transmission, the block diagram of FIG. 1 is modified to provide digital encoding and decoding as shown in FIGS. 4 and 6.

Figure 4:
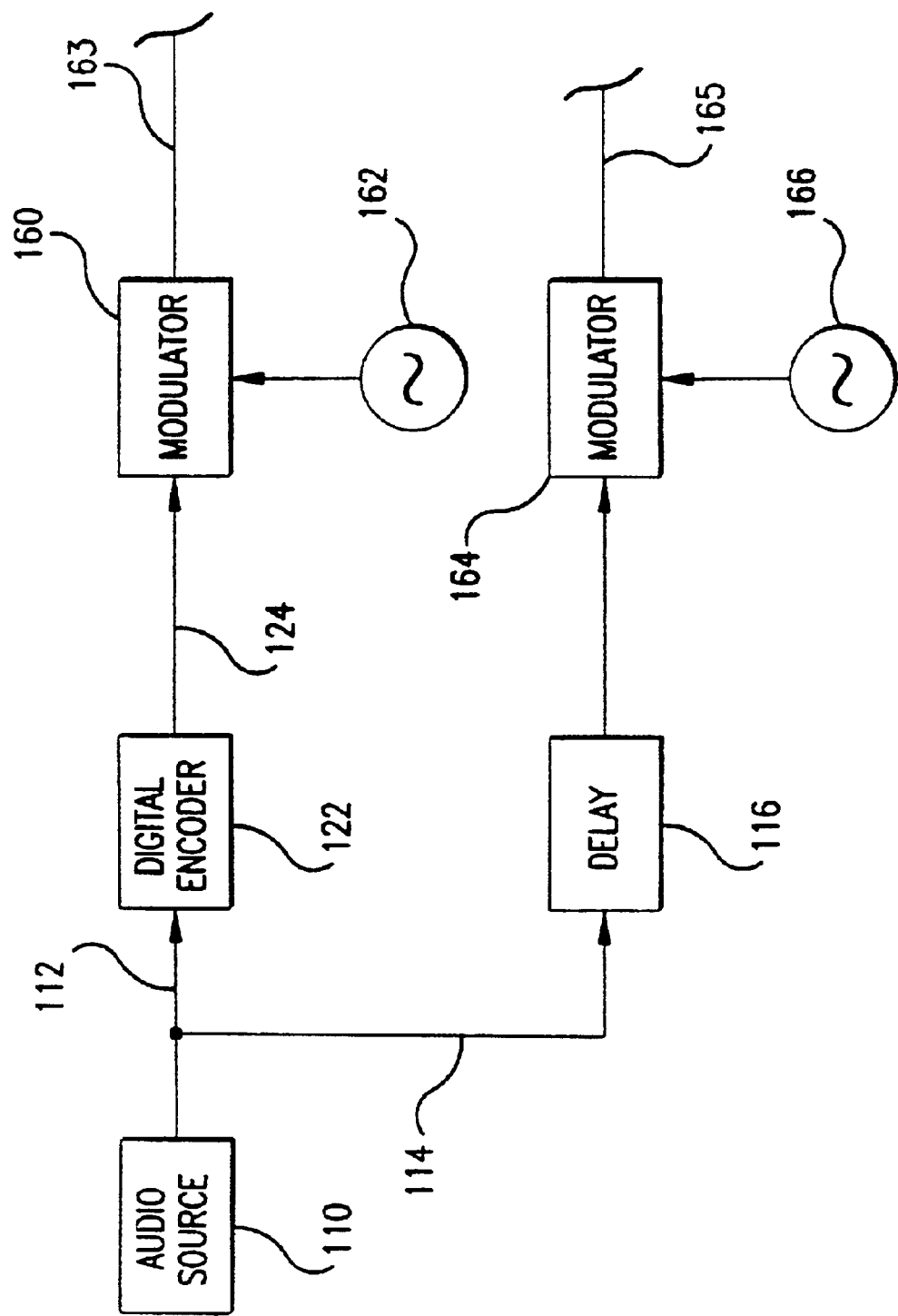
FIG. 4 is a circuit block diagram of a portion of the transmitter subsystem for a digital application of the present invention.

As shown in FIG. 4, the audio source 110 provides an audio signal on line 114 which is coupled to the delay circuit 116 and from there to modulator 164, as previously described. In this version of the digital audio broadcast system, the redundant audio signal is the FM modulated signal which is being delayed for use in the digital audio receivers to replace corrupted digital data, when necessary. The primary audio signal, provided on line 112, is coupled to a digital encoder 122. The particular digital encoding and compression techniques utilized are not important to the inventive concepts, as herein disclosed, and may represent conventional digital transmission techniques, such as interleaving, convolutional coding and forward error correction techniques. The digitally encoded signal output on line 124 is coupled to the modulator 160, wherein a predetermined number of bits are modulated onto each of the plurality of subcarriers.

At the receiver end, the received redundant radio signal, which is the delayed conventional FM multiplex stereo broadcast signal, is handled as previously described. As shown in FIG. 6, the primary audio signal is coupled to demodulator 180 and from there to delay circuit 184, and then coupled to digital decoder 185. Digital decoder 185 may include a de-interleaver, as well as a forward error correction decoder. Subsequent to decoding, which may include the error correction and detection within the digital decoder block 185, the signal is converted to an analog audio signal in digital-to-analog converter 187. From there, the signal is handled as has previously been described.

Figure 5:
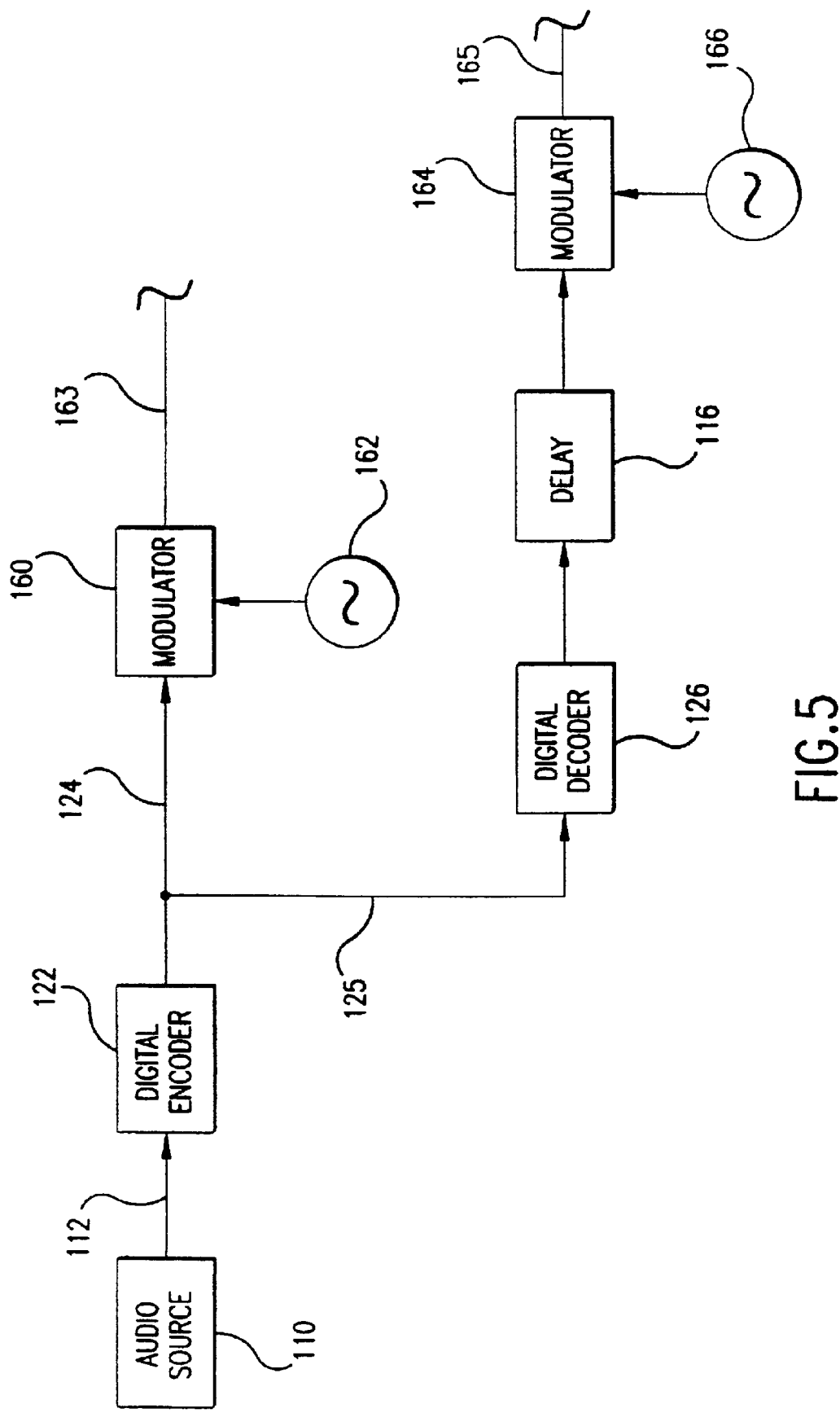
FIG. 5 is a circuit block diagram for an alternate configuration of a portion of the transmitter subsystem for a digital application of the present invention.

Because it is important that the respective time delays of the primary audio signal path and the redundant audio signal path be made equivalent prior to their respective coupling to the blending circuit subsystem 135, and the digital processing circuits of the IBOC DAB system introduces certain delays, it may be desirable to separately account for those delays in the redundant signal path. As shown in FIG. 5, the audio signal from audio source 110 is coupled to the digital encoder 122 by coupling line 112, and from there is coupled to the modulator 160 by coupling line 124, as previously described. However, as opposed to coupling the analog audio signal directly to the modulator 164, through the delay 116, the circuit of FIG. 5 couples the digitized audio signal to a digital decoder 126, by coupling line 125. Digital decoder 126 incorporates the same decoding functions as decoder 185 utilized for the primary audio signal, and includes the digital-to-analog conversion function represented by the block 187 in FIG. 6. Thus, the redundant audio signal is exposed to the same processing delays as the primary audio signal, which delays then need not be accounted for in either of delay circuits 116 or 184. Where such processing delays are invariant, then such may be accounted for by reducing the delay added by the delay circuit 184, to then bring the primary audio signal in temporal alignment with the redundant audio signal.

Figure 7:
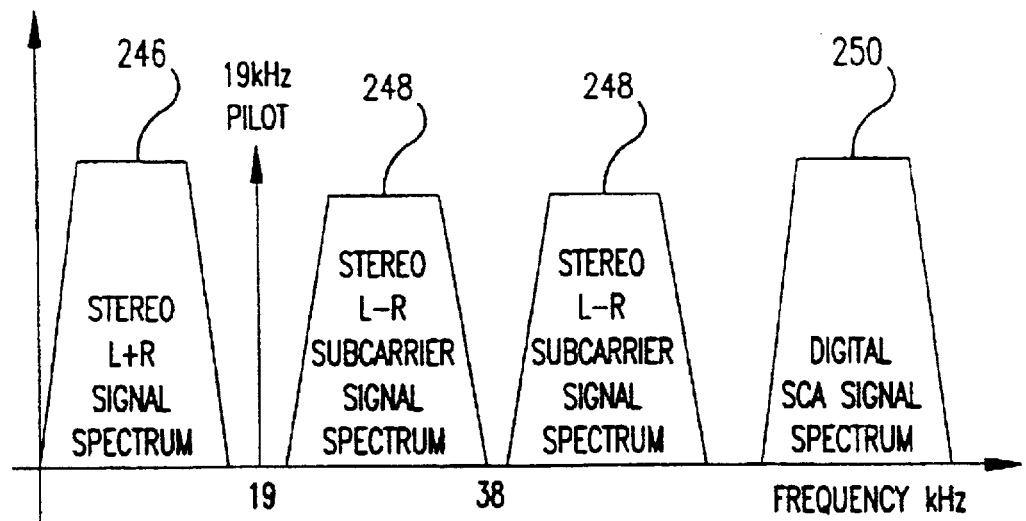
FIG. 7 is a diagram of the signal spectrum for another application of the present invention.

Another scheme for providing a redundant audio source is represented by the signal spectrum shown in FIG. 7. For a particular FM channel, the signal spectra 246 and 248 represent the respective signal spectrum for each of the FM stereo left+right (L+R) and left–right (L–R) signals. Displaced from that spectrum is the signal spectrum of the subsidiary communications authorization (SCA) signal, where such subcarrier is modulated with the DAB signals, as the primary radio signal. The SCA signal spectrum is spaced 53 kHz from the FM center frequency. Like the IBOC DAB system, the analog stereo broadcast may be used to form the redundant audio information that is transmitted after a predetermined delay, to form the delayed redundant audio signal.

Figure 8:
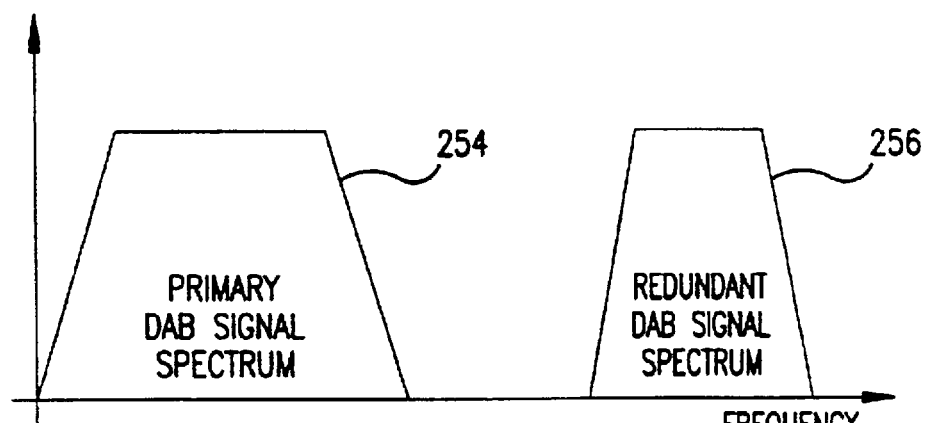
FIG. 8 is a diagram of the signal spectrum for a non-in-band on-channel digital audio broadcast system; and, FIG. 9 is a diagram of the spectrum for a purely analog application of the present invention.

The time diversity scheme outlined above may also be applied to a non-IBOC DAB system. In a digital-only system, wherein the digital broadcast spectrum is separate and distinct from the conventional analog FM broadcast stations, as shown in FIG. 8, a high data rate primary DAB signal spectrum 254 is provided with a separate redundant, but lower data rate, signal spectrum 256 displaced therefrom. The redundant DAB signal is time delayed with respect to the primary DAB signal, just as in the IBOC system wherein the analog FM is time delayed with respect to the digital signal. Here, the digital redundant signal is time delayed with respect to the primary digital signal. Both signals experience processing delays for encoding, interleaving, de-interleaving, forward error correction decoding and digital-to-analog conversion, for example. Additionally, a delay in the range of 2.0 to 5.0 seconds is added in order to provide a sufficient time diversity to provide the desired uncorrelation between the two parallel transmission paths. As the redundant digital audio signal is only utilized periodically, and for short durations, an economical tradeoff can be made between fidelity and data rate. Therefore, while the listener may detect a temporary degradation in audio quality during the redundant blend duration, the user will not experience an outage or any undesirable acoustic artifacts during the transition between the primary and redundant data signals.

Figure 9:
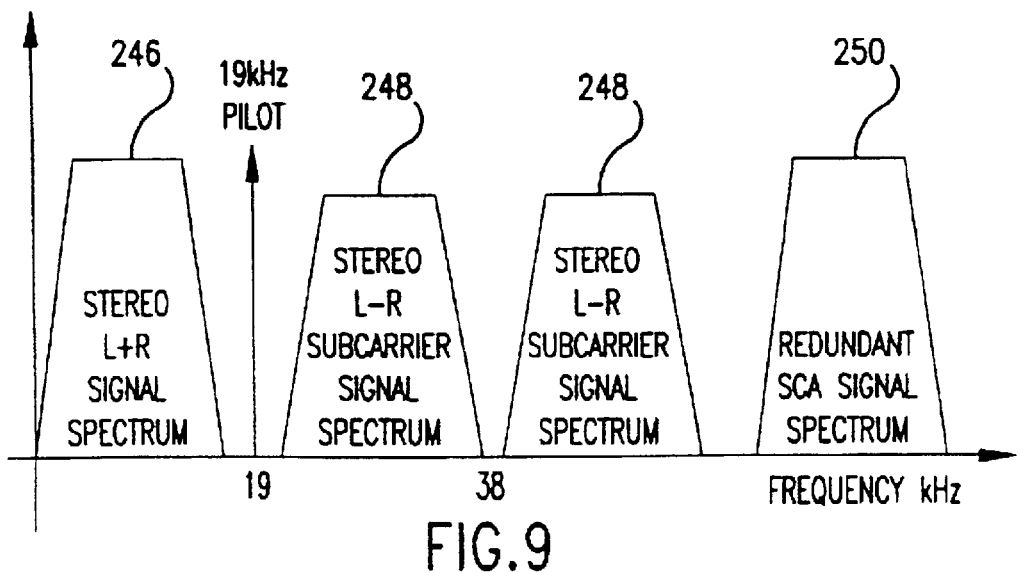

As yet another application for the time diversity scheme, as outlined herein, is improving the resistance to outages for conventional FM broadcasts. In such a scheme, the broadcast spectrum, as shown in FIG. 9, provides for the conventional stereo signal spectra 246, 248 as well as an SCA signal spectrum 250 which in this invention carries a redundant audio signal. In this scheme, the FM stereo broadcast is the primary audio signal and is transmitted undelayed, while the redundant information that is modulated on an SCA subcarrier would be delayed by a time period within the range of approximately 2.0 to 5.0 seconds.

Irrespective of whether the primary audio signal is broadcast as an analog or digital signal, the key to mitigating outages is the broadcast of a redundant signal which is delayed with respect to the primary signal by a sufficient time period so that the two transmission channels are statistically uncorrelated with respect to a fade or outage. One limitation on the delay time period is the effect that such would have on tuning from one station to another. In addition to constraining the delay time, that limitation can be overcome by substituting the redundant signal during the tuning intervals. Also important is the scheme by which the redundant audio signal is substituted for the primary signal during the mitigation process. As previously discussed, system 100 provides for a smooth transition wherein the redundant signal is blended in to the input to the audio output circuit while the "soon to be degraded" primary signal is blended out. As the primary audio signal is delayed for a time period greater than 2.0 seconds, system 100 detects a fade or blockage of the primary signal long before a listener would detect it, providing time for a smooth and relatively slow transition to the redundant signal. As such substitutions are intermittent, and for brief periods of time, the quality of the redundant signal need not be at the same level as that of the primary signal. In the case of an IBOC DAB system, the redundant signal may be the lower quality conventional FM broadcast signal, or a lower data rate digital signal, modulated on one or more SCA subcarriers or other specially assigned subcarriers. In the case of a conventional analog FM broadcast signal, such may be backed up with a redundant analog signal modulated on an SCA subcarrier. Although the above discussion has centered around broadcast in the FM signal spectra, the time diversity and blending functions are equally applicable to transmissions in the AM band, and in particular to digital audio broadcast in the AM band, wherein a conventional analog AM broadcast may be utilized as the redundant audio signal for a digital broadcast of the same audio material.

In carrying out the method of mitigating intermittent interruptions in an audio radio broadcast, the following steps are carried out.

An audio signal is provided and used to modulate at least one radio frequency signal. Where the broadcast is intended to be a digital radio broadcast, the modulation step would include the step of digitally encoding the audio signal. Whether digital or audio, such signal would be considered the primary audio signal.

A first time delay is also added to the audio signal to form a delayed redundant audio signal. The delayed redundant audio signal may be an analog or a digital signal, and if a digital signal is utilized such may be at a lower data rate than that of the primary signal. A second radio frequency signal, which may be a subcarrier of the first radio frequency signal, is modulated with the delayed redundant audio signal. The modulated primary audio signal and the modulated redundant audio signal are received and the respective audio signals recovered therefrom.

A quality measurement is made of at least a radio signal carrying the primary audio signal information. The quality measurement may include a measure of such parameters as signal-to-noise ratio, bit error rate, signal power level and results of a cyclic redundancy check.

A second predetermined time delay is added to the recovered primary audio signal to form a delayed primary audio signal, the second predetermined time delay being substantially equal to that of the first predetermined time delay in order to temporally align the primary audio signal with the delayed redundant audio signal. The time delay is selected from a time period within the approximating range of 2.0 to 5.0 seconds.

A first weighting factor is established, the first weighting factor being equal to 1.0 when the quality measurement is at least as great as a predetermined threshold value and smoothly transitions to 0.0 over a predetermined time period when the quality measurement is less than the predetermined threshold value, indicating a fade or blockage of the signal.

A second weighting factor is established, the second weighting factor being equal to 0.0 when the quality measurement is at least as great as the predetermined threshold value and smoothly transitioning to 1.0 over the predetermined time period when the quality measurement is less than the predetermined threshold value.

The first weighting factor and the delayed primary audio signal are combined, and the second weighting factor is combined with the delayed redundant audio signal.

The weighted delayed primary audio signal is combined with the weighted delayed redundant audio signal to form a composite audio signal.

Lastly, the composite audio signal is coupled to an audio output circuit.

In particular, the above described method may be employed with a digital audio broadcast in that the audio source signal is first digitally encoded before being utilized to modulate a radio frequency signal. That radio frequency signal may include one or more subcarriers which are spaced from a center frequency of an FM broadcast signal spectrum within the approximating range of 130–199 kilohertz. A second radio frequency signal may comprise one subcarrier of a conventional analog FM multiplex stereo broadcast signal spectrum, which would then be delayed as previously discussed. Alternately, the redundant audio information may be modulated on an SCA subcarrier of an FM broadcast signal spectrum, or alternately, the primary digital audio signal may be modulated on one or more radio frequency signals within the SCA signal spectra as the redundant signal for either a primary digital audio broadcast or a conventional analog FM audio broadcast.

Although this invention has been described in connection with specific forms and embodiments thereof, it will be appreciated that various modifications other than those discussed above may be resorted to without departing from the spirit or scope of the invention, for example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A receiver for an in-band on-channel broadcast signal including a first plurality of subcarriers positioned in upper and lower sidebands of a broadcast channel and orthogonal frequency division modulated by a first digital signal, and a second plurality of subcarriers orthogonal frequency division modulated by a second digital signal, wherein said second digital signal is delayed with respect to said first digital signal and has a lower data rate than said first digital signal, said receiver comprising:

means for demodulating said first plurality of subcarrier to produce a first demodulated signal;

means for demodulating said second plurality of subcarriers to produce a second demodulated signal;

means for delaying said first demodulated signal with respect to said second demodulated signal;

means for using said second demodulated signal to produce an initial output signal; and means for blending said first and second demodulated signals to produce a subsequent output signal.

2. A receiver for an in-band on-channel broadcast signal as recited in claim 1, wherein said first digital signal and said second digital signal represent the same audio information.

3. A receiver for an in-band on-channel broadcast signal as recited in claim 1, wherein:

said upper sideband ranges from about 130 kHz to about 199 kHz from said first carrier; and said lower sideband ranges from about −130 kHz to about −199 kHz from said first carrier.

4. A receiver for an in-band on-channel broadcast signal as recited in claim 1, wherein said means for selecting one said first and second demodulated signals to be used to produce an output signal comprises:

means for detecting degradation of one said first and second demodulated signals by determining one or more parameters selected from the group consisting of signal-to-noise ratio, bit error rate, signal power level and cyclic redundancy check.

5. A method of receiving an in-band on-channel composite broadcast signal including a first plurality of subcarriers positioned in upper and lower sidebands of a broadcast channel and orthogonal frequency division modulated by a first digital signal, and a second plurality of subcarriers orthogonal frequency division modulated by a second digital signal wherein said second signal is delayed with respect to said first digital signal, and said second digital signal has a lower data rate than said first digital signal, said method comprising the steps of:

demodulating said first plurality of subcarriers to produce a first demodulated signal;

demodulating said second plurality of subcarriers to produce a second demodulated signal;

delaying said second demodulated signal with respect to said first demodulated signal;

using said second demodulated signal to produce an initial output signal; and subsequently producing an output signal by blending said first and second demodulated signals in response to a signal quality of the first demodulated signal.

6. A method of receiving an in-band on-channel broadcast signal as recited in claim 5, wherein said first digital signal and said second digital signal represent the same audio information.

7. A method of receiving an in-band on-channel broadcast signal as recited in claim 5, wherein:

said upper sideband ranges from about 130 kHz to about 199 kHz from said first carrier; and said lower sideband ranges from about −130 kHz to about −199 kHz from said first carrier.

8. A method of receiving an in-band on-channel broadcast signal as recited in claim 5, wherein said step of selecting one said first and second demodulated signals to be used to produce an output signal comprises the step of:

detecting degradation of one said first and second demodulated signals by determining one or more parameters selected from the group consisting of signal-to-noise ratio, bit error rate, signal power level and cyclic redundancy check.

9. A method of transmitting and receiving a broadcast signal, comprising the steps of:

providing a primary broadcast signal;

generating a redundant broadcast signal having a lower quality or a lower data rate than the primary broadcast signal and being delayed in time with respect to the primary broadcast signal, and combining the primary broadcast signal and the redundant broadcast signal to form a composite signal;

transmitting the composite signal;

receiving the composite signal and separating the composite signal into the primary broadcast signal and the redundant broadcast signal;

initially using the redundant broadcast signal to produce an output;

blending the output from the redundant broadcast signal to the primary broadcast signal; and blending the output from the primary broadcast signal to the redundant broadcast signal when the primary broadcast signal is degraded.

10. The method of claim 9, wherein:

the primary broadcast signal comprises a digital signal; and the redundant broadcast signal comprises an analog signal.

11. The method of claim 10, wherein said analog signal and said digital signal represent the same audio information.

12. The method of claim 9, wherein:

the primary broadcast signal comprises a first digital signal; and the redundant broadcast signal comprises a second digital signal having a lower data rate than said first digital signal.

13. The method of claim 9, wherein:

the redundant broadcast signal comprises a frequency modulated first carrier; and wherein the primary broadcast signal comprises a plurality of orthogonal frequency modulated subcarriers in an upper sideband ranging from about 130 kHz to about 199 kHz from said first carrier, and in a lower sideband ranging from about −130 kHz to about −199 kHz from said first carrier.

* * * * *

UNITED STATES PATENT AND TRADEMARK OFFICE
CERTIFICATE OF CORRECTION

PATENT NO. : 6,901,242 B2
APPLICATION NO. : 09/747143
DATED : May 31, 2005
INVENTOR(S) : Brian W. Kroeger and Roy R. Stehlik Page 1 of 1

It is certified that error appears in the above-identified patent and that said Letters Patent is hereby corrected as shown below:

On the title page, item:
(56) References Cited
"6,602,835" should read -- 5,602,835 --

(74) Attorney, Agent, or Firm
"Pietragalio" should read -- Pietragallo --

Column 2, Line 3
"signal-and" should read -- signal and --

Signed and Sealed this

Fifth Day of September, 2006

JON W. DUDAS
*Director of the United States Patent and Trademark Office*